US011282507B1

(12) United States Patent
Shi et al.

(10) Patent No.: US 11,282,507 B1
(45) Date of Patent: Mar. 22, 2022

(54) CONTEMPORANEOUS MACHINE-LEARNING ANALYSIS OF AUDIO STREAMS

(71) Applicant: CRESTA INTELLIGENCE INC., San Francisco, CA (US)

(72) Inventors: Tianlin Shi, Menlo Park, CA (US); Kenneth George Oetzel, Belmont, CA (US)

(73) Assignee: CRESTA INTELLIGENCE INC., San Francisco, CA (US)

( * ) Notice: Subject to any disclaimer, the term of this patent is extended or adjusted under 35 U.S.C. 154(b) by 0 days.

(21) Appl. No.: 17/352,543

(22) Filed: Jun. 21, 2021

Related U.S. Application Data

(63) Continuation of application No. 17/083,486, filed on Oct. 29, 2020, now Pat. No. 11,049,497, which is a continuation of application No. 17/080,100, filed on Oct. 26, 2020, now abandoned.

(51) Int. Cl.
| | |
|---|---|
| *G10L 15/16* | (2006.01) |
| *G10L 15/22* | (2006.01) |
| *G06F 21/62* | (2013.01) |
| *G10L 15/06* | (2013.01) |
| *G10L 25/51* | (2013.01) |
| *G06N 20/00* | (2019.01) |
| *G10L 15/08* | (2006.01) |
| *H04M 3/51* | (2006.01) |

(52) U.S. Cl.
CPC .......... *G10L 15/16* (2013.01); *G06F 21/6227* (2013.01); *G06N 20/00* (2019.01); *G10L 15/063* (2013.01); *G10L 15/22* (2013.01); *G10L 25/51* (2013.01); *G10L 2015/088* (2013.01); *H04M 3/51* (2013.01)

(58) Field of Classification Search
CPC ..... G06N 20/00; G06F 21/6227; G10L 15/16; G10L 15/063; G10L 15/22; G10L 25/51; G10L 2015/088; H04M 3/51
See application file for complete search history.

(56) References Cited

U.S. PATENT DOCUMENTS

| | | | |
|---|---|---|---|
| 8,145,492 B2 * | 3/2012 | Fujita | G10L 13/00 704/270 |
| 10,586,237 B2 | 3/2020 | Coughlin et al. | |
| 10,916,253 B2 * | 2/2021 | Topaloglu | G10L 15/22 |
| 2004/0172252 A1 * | 9/2004 | Aoki | G10L 21/0208 704/270 |
| 2011/0060587 A1 * | 3/2011 | Phillips | G10L 15/30 704/235 |

(Continued)

*Primary Examiner* — Michael Colucci
(74) *Attorney, Agent, or Firm* — Invoke

(57) ABSTRACT

Described techniques select portions of an audio stream for transmission to a trained machine learning application, which generates response recommendations in real-time. This real-time response is facilitated by the system identifying, selecting and transmitting those portions of the audio stream likely to be most relevant to the conversation. Portions of an audio stream less likely to be relevant to the conversation are identified accordingly and not transmitted. The system may identify the relevant portions of an audio stream by detecting events in a contemporaneous event stream, use a trained machine learning model to identify events in an audio stream, or both.

20 Claims, 5 Drawing Sheets

(56) References Cited

U.S. PATENT DOCUMENTS

| | | | |
|---|---|---|---|
| 2012/0221330 A1* | 8/2012 | Thambiratnam | G10L 25/84 704/235 |
| 2013/0138637 A1* | 5/2013 | Bachtiger | G06F 16/43 707/723 |
| 2018/0124243 A1* | 5/2018 | Zimmerman | H04M 3/5175 |
| 2019/0341050 A1* | 11/2019 | Diamant | G10L 17/00 |
| 2020/0094416 A1* | 3/2020 | Park | G06K 9/00597 |
| 2020/0174740 A1* | 6/2020 | Martay | H04R 3/00 |
| 2021/0056966 A1* | 2/2021 | Bilac | G10L 15/1815 |

* cited by examiner

CONTEMPORANEOUS MACHINE-LEARNING ANALYSIS OF AUDIO STREAMS

INCORPORATION BY REFERENCE; DISCLAIMER

The following applications are hereby incorporated by reference: application Ser. No. 17/083,486 filed on Oct. 29, 2020; application Ser. No. 17/080,100 filed on Oct. 26, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to extracting a portion an audio stream for real-time analysis of audio/video conversations. In particular, the present disclosure relates to extracting the portion of the audio stream from an operating system platform based on application event data.

BACKGROUND

Audio stream analysis may be useful in a variety of contexts. For example, customer support agents may benefit from real time analysis of interactions with callers. This real time analysis could potentially be used to guide customer support agent through caller interactions, provide technical information to the agent in real time with the call, or provide real-time authorization for business decisions (e.g., offering discounts or refunds). However, audio stream data may not be able to be captured from an application promptly enough to the support real time analysis that would be beneficial.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
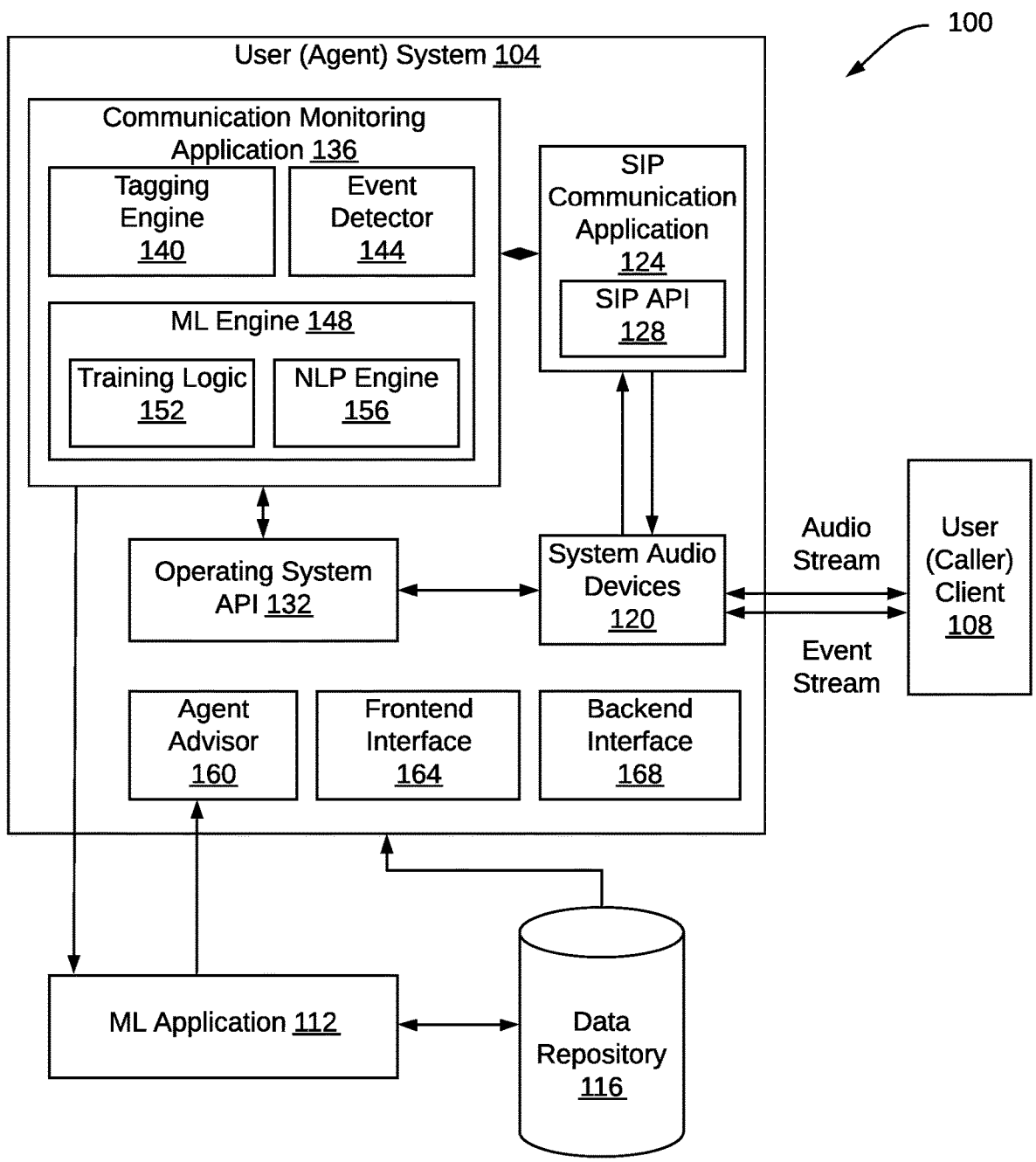
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SELECTING PORTIONS OF A COMMUNICATION STREAM FOR REAL-TIME ANALYSIS
   3.1 SELECTING PORTIONS OF AN AUDIO STREAM BASED ON EVENTS IN AN EVENT STREAM
   3.2 SELECTING PORTIONS OF AN AUDIO STREAM BASED ON MACHINE LEARNING ANALYSIS OF THE AUDIO STREAM
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One challenge faced by customer support agents in a call center is the prompt identification of an appropriate response to a participant in the conversation (e.g., a caller, a customer engaging in a conversation via text interface, a correspondent). This difficulty is due in part to the high volume of call traffic in a customer support center, the unpredictable nature of conversation, and the voluminous scripted responses that are provided to agents as a resource. While a script resource (e.g., books, searchable databases) may be helpful in theory, in practice the ability of an agent to promptly identify an appropriate response or select between responses may be difficult. While machine learning techniques may be employed in some circumstance to identify an appropriate response, computation times for machine learning applications may not be fast enough to provide the appropriate response to match the natural pace of verbal conversations.

One or more embodiments of the present disclosure describe selecting portions of an audio stream for transmission to a trained machine learning application, which generates response recommendations for the agent in real-time. This real-time response is facilitated by the system selecting and transmitted those portions of the audio stream likely to be most relevant to the conversation. Selecting and transmitting only these relevant portions of the audio stream, instead of sending an audio stream in its entirety, reduces the time needed for the machine learning application to perform its analysis. This faster and more efficient processing enables the machine learning application to analyze the audio stream contemporaneously with a conversation and provide guidance to an agent consistent with a pace and rhythm of a conversation.

In some embodiments, the system may identify and extract relevant portions of an audio stream. In some examples, the portions of the audio stream extracted by the operating system API are identified using a trained machine learning model that identifies application events indicating relevant portions of the audio stream. The system may access (and subsequently extract) portions of an audio stream using an operating system API in direct communication with audio system devices (e.g., a microphone, a speaker).

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a user system 104 (e.g., used by call center agent), a user client 108 (e.g., corresponding to a caller to the call center), an ML application 112, and a data repository 116. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, the user system 104 (e.g., employed by a call center agent) includes various system audio input and output devices 120, a communication application 124, a corresponding communication application API (application programming interface) 128, an operating system API 132, and a communication monitoring application 136. The user system 104 also includes an agent advisor 160, a frontend interface 164, and a backend interface 168.

In one or more embodiments, the user system 104 refers to hardware and/or software configured to perform operations described herein for identifying, selecting, and transmitting portions of operating system audio streams for real-time analysis by a trained machine learning model. Examples of operations for identifying, selecting, and transmitting portions of operating system audio streams for real-time analysis are described below with reference to the following FIGS. 2 through 4.

In an embodiment, the user system 104 (and the ML application 112) is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Incoming and outgoing audio signals associated with an audio stream of an audio call session are received and transmitted by system audio devices 120. Example system audio device 120 include one or more microphones and one or more speakers. Examples of microphones and speakers of the system audio devices 120 may include, but are not limited to, traditional electrodynamic devices. Electrodynamic microphones (e.g., condenser microphones, dynamic microphones) and speakers include various elements, such as transducers, electromagnetic elements, and/or diaphragms that convert audio signals to electrical signals, and vice versa. In other examples, a microphone may be a microelectrical mechanical system (MEMS) microphone, such as those commonly employed in mobile communication devices.

In some embodiments, the system audio devices 120 include those that are built into or integral with a computer system. These include integrated or "internal" speakers, integrated or "internal" microphones, and the like. In some embodiments, the system audio devices 120 include speakers and microphones that are releasably connected through a physical or virtual port. These include USB or wireless headphones and microphones. In some examples, the audio devices 120 are integrated into a single releasable device, such as an "external" headphone with an attached microphone that is communicatively coupled to the user system 104.

An audio stream corresponding to inbound (to the user system 104) audio signals from the user client 108 and outgoing audio signals from the user system 104 may be managed via a session initiation protocol (SIP) communication application 124. The SIP communication application 124 may receive inbound calls from the user client 108 regardless of the technology used by the user client 108. For example, the SIP communication application 124 may receive calls via the public switched telephone system (i.e., "land lines" or "PSTN"), mobile telephone, or internet-based audio communication protocols (e.g., voice over internet or "VOIP"). Regardless of the audio technology ultimately used, the SIP communication application 124 may engage with digital audio signals (as instantiated by transmitted audio packets in a packet switched network) or convert audio signals associated with the PSTN into digital signals.

While other types of communication application systems may be used in other embodiments of the system 104, such as a VOIP application, the SIP communication protocol application 124 shown in FIG. 1 has the advantage of managing multiple different types of media streams. That is, the SIP protocol is configured for managing not only audio streams, but also data streams of additional non-audio systems, such as video streams and event streams from other computer applications. With this capability, the SIP communication application 124 may manage and administer the audio stream via the system audio devices 120 and simultaneously manage a contemporaneous event stream generated by a different computing application. In this way, the system 104 may coordinate multiple streams from corresponding multiple different applications.

The SIP communication application 124 interacts with audio data transmitted to and received from the system audio devices 120 with a SIP API 128. The SIP API 128 may convert audio signals transmitted to or received from the system audio devices 120 into an appropriate form. For example, the SIP API 128 may receive an audio signal from a speaker 120 and convert it into one or more data packets that may then be processed through the SIP communication application 124 according to one or more embodiments described herein. Similarly, the SIP API 128 may receive an audio signal from a microphone 120 and prepare it as one or more data packets that in turn may be processed through the SIP communication application 124 according to one or more embodiments described herein.

The operating system API 132 is an API that is configured to interact directly with, and as a component of, an operating system platform of the user system 104. That is, the operating system API 132 is a component of the elements that execute applications, tasks, and control the various components of the user system 104 itself, including the system audio devices 120.

As shown in FIG. 1, the operating system API 132 may communicate directly with the system audio devices 120 as well as the communication monitoring application 136. Using the operating system API 132 to facilitate direct communications between the system audio devices 120 and the communication monitoring application 136 has a number of advantages. For example, this architecture of interaction improves the speed and computational efficiency of transmitting audio signals to and from the communication monitoring application 136 by omitting various intervening levels of signal processing present when using the SIP communication application 124 and the SIP API 128. In some examples, the delay caused by translating audio stream signals as received at the system audio devices 120 into SIP communication protocol signals and then back into a protocol used by the operating system for processing by the communication monitoring application 136 would reduce the speed of computations otherwise used for the contemporaneous audio stream processing described below.

The communication monitoring application 136 processes an audio stream (and optionally processes one or more event streams) to identify portions of the stream(s) to transmit to the ML application 112 for contemporaneous analysis. The communication monitoring application 136 includes a tagging engine 140, an event detector 144, and a machine learning (ML) engine 148, which in turn includes training logic 152 and a natural language processing engine 156.

As indicated above, the communication monitoring application 136 may receive an audio stream from the system audio devices 120 via the operating system API 132. The audio stream (optionally in coordination with one or more associated event streams) may be analyzed to identify which portions of the stream(s) to transmit to the ML application 112 and which portions of the stream(s) to refrain from transmitting.

To accomplish this, the tagging engine 140 of the communication monitoring application 136 may, in response to analysis provided by other elements of the communication monitoring application 136, apply tags to audio stream or combined audio and event streams. The tags applied by the tagging engine 140 may denote portions to be transmitted to the ML application 112 and/or denote portions of the stream(s) to refrain from transmitting. The tagging engine 140 may use chronometer or system clock metadata associated with multiple streams to coordinate audio stream data with event stream data. For example, this time data may be used by the communication monitoring application 136 to identify both words spoken in a conversation as well as contemporaneous data searches executed by an agent through a web browser or proprietary data system via the user system 104.

The event detector 144 may include functions that can identify various key words, audio and/or event stream events, and/or user operations that may be passed to the tagging engine 140. The information generated by the event detector 144 may be used by the tagging engine 140 to denote portions of the stream(s) to either transmit to the ML application 112 for analysis or to refrain from transmitting to the ML application 112.

In some embodiments, the event detector 144 may monitor the one or more streams and identify one or more events therein. For example, the event detector 144 may identify an initiation of a communication session by the SIP communication application 124 with the user client 108. In another example, the event detector 144 may identify, within a SIP communication session, execution of computing application instructions. Examples of these instructions include a product search, a user profile search, creation of a user profile, and creation of a new record associated with the communication session.

In some examples, events detected by the event detector 144 may be used to instruct the tagging engine 140 to apply a tag according to a set of one or more rules. In some examples, a first tag applied to a stream in response to initiation of a communication session may be associated with a rule that indicates the tagged portion of the conversation is merely preliminaries not to be transmitted to the ML application 112. In some examples, the system may apply a second tag associated with executing a product search to a stream location after the first tag. This second tag may be associated with a rule that triggers transmission of a corresponding portion of an audio stream to the ML application 112. In still other examples, these two rules and their tags may be engaged in cooperation with one another to more precisely specify the portions of the stream(s) to transmit to the ML application 112.

The event detector 144 may be configured to detect any number of events, using corresponding rules, that improve the response time and computational efficiency of various embodiments herein. In some examples, the event detector 144 may use rules to select portions of streams to transmit (and/or not transmit) based on different types of conversations. In some examples, a conversation type may be selected by the user of the user system 104 or may be detected by the event detector 144 based on one or more characteristics of the communication. For example, the event detector 144 may detect different phone numbers (or via different user resource links (URLs)) called by the user client 108. Each of these phone numbers or links may be associated with different call types, whether a purchase call, a general information call, a complaint, a return, and the like. Each of these different numbers may be associated, via a rule stored in the event detector 144, with a corresponding call type and a transmission profile. For example, because of the often contentious nature of complaints, the event detector 144 may store a profile for complaint calls that directs the system to transmit an entirety of the call to the ML application 112. In another example, because product inquiry calls often involve socializing and rapport building, the event detector 144 may store a profile that directs the system to only transmit portions of the audio stream to the ML application 112 that correspond to execution of searches, queries, or other transactions during a contemporaneously operating computer application separate from the SIP communication application 124.

In some examples, the ML engine 148 of the communication monitoring application 136 may operate in cooperation with the event detector 144, and its corresponding rules, to identify portions of an audio stream to transmit and/or not transmit to the ML application 112 for real-time analysis. In some examples, the ML engine 148 may recognize words spoken in an audio stream and instruct the tagging engine 140 to apply corresponding tags to the stream in response to the recognized words. In other examples, the ML engine 148 may recognize combinations of spoken words and transactions executed by computing applications and instruct the tagging engine 140 to apply corresponding tags to the stream in response. The ML engine 148 may recognize the spoken words and/or computing application transactions in response to training executed by the training logic 152 and/or the natural language processing engine 156.

In some embodiments, the training logic 152 receives a set of electronic documents as input (i.e., a training corpus). Examples of electronic documents include, but are not limited to, electronically stored transcriptions of conversations and/or electronically recorded conversations. In some examples, the stored transcriptions and/or recorded conversations may be accompanied by an event stream from one or more computing applications.

A conversation or conversation file (e.g., a transcript, a recording) supplied to the training logic 152 may include labels that identify words, phrases, events of an audio stream, and/or events in an event stream corresponding to portions of the stream(s) to either transmit or not transmit for machine learning analysis. The system may use these labeled training materials to learn phrases and/or events to be selected for machine learning analysis in a new, "target" conversation.

The training logic 152 may be in communication with a user system, such as system 104. The system 104 may include an interface used by agents to apply labels to the electronically stored transcriptions of conversations and/or electronically recorded conversations and event streams. Alternatively, labels may be applied via the system 104 contemporaneously with a target conversation, which may also be used to by the training logic 152 to train the ML engine 148.

In some embodiments, the training logic 152 is configured to identify feature values and generate feature vectors from the conversation and event streams described above, collectively referred to as a training corpus. The training logic 152 may tokenize words and phrases in a training corpus into vocabulary tokens. The training logic 152 may then generate feature vectors that include a sequence of values, with each value representing a different vocabulary token. Examples of feature vectors generated by the training logic 152 include, but are not limited to, term frequency feature vectors and term-frequency/inverse document frequency feature vectors. The labels assigned to words and phrases in the training corpus documents may then be associated with corresponding feature vectors.

The training logic 152 may append other features to the generated feature vectors. In one example, a feature vector may be represented as [$f_1$, $f_2$, $f_3$, $f_4$], where $f_1$, $f_2$, $f_3$ correspond to tokens and where $f_4$ is a non-vocabulary feature. Example non-vocabulary features may include, but are not limited to, a total duration of a communication session, an elapsed time of communication session, a type of call, detected events from an event stream, among others. The training logic 152 may optionally be applied to target conversations to facilitate their analysis.

The ML engine 148 is configured to automatically learn, from the conversation training logic 152, which portions of a communication session to transmit to an ML application 112 for analysis. Example techniques for identifying these portions of the communication session are described below in more detail in the context of FIGS. 2, 3, and 4.

The natural language processing (NLP) engine 156 embodies one example of a natural language processing technique that may optionally be applied in some examples. In some examples, the NLP engine 156 may operate in cooperation with the feature vector generator of the training logic 152 to analyze audio and/or event streams. The NLP engine 156 may generate a vocabulary from the training corpus and then generate content vectors using a topic modeling algorithm. Examples of feature vectors commonly used in topic modeling include, but are not limited to TF-IDF, or term frequency count vectors. A set of topics may be determined for a corpus of content. Examples of topic modeling algorithms include, but are not limited to, latent Dirichlet allocation (LDA) or correlated topic modeling (CTM). It will be appreciated that other types of vectors may be used in probabilistic analyses of latent topics. The topic vectors may be used to identify content in communication sessions that triggers the tagging engine 140 to apply a tag.

Upon identifying a portion (or portions) of a communication session to transmit, the communication monitoring application transmits the portion(s) of the communication session to the ML application 112. The ML application 112 then analyzes the portion(s) of the communication session and generates recommendations for responses based on the analysis. Examples of analyses performed on the portions of the communication sessions and the responses generated by the ML application 112 are described in U.S. patent application Ser. Nos. 16/836,831 and 16/944,651, filed on Mar. 31, 2020 and Jul. 31, 2020, respectively. These applications are incorporated herein in their entireties.

Recommendations generated by the ML application 112 are then transmitted from the ML application 112 to the agent advisor 160 of the user system 104. The agent advisor 160 may coordinate the received recommendation with the particular session the recommendation corresponds to. This may be particularly useful for situations in which an agent is communicating with multiple different user clients 108. The agent advisor 160 may render the recommendation in a user interface, such as frontend interface 164.

In one or more embodiments, a data repository 116 may be used to store various data items used by the system 100. For example, the data repository 116 may store a training corpus, user profiles, product data, portions of audio streams, portions of event streams, among other types of data. The data repository 116 may be any type of storage unit and/or device (e.g., a file system, database, collection of tables, or any other storage mechanism) for storing data. Further, a data repository 116 may include multiple different storage units and/or devices. The multiple different storage units and/or devices may or may not be of the same type or located at the same physical site. Further, a data repository 116 may be implemented or may execute on the same computing system as the user system 104 and/or the ML application 112. Alternatively or additionally, a data repository 116 may be implemented or executed on a computing system separate from the user system 104 and/or the ML application 112. A data repository 116 may be communicatively coupled to one or both of the user system 104 and/or the ML application 112 via a direct connection or via a network.

Frontend interface 164 manages interactions between the user system 104, the user client 108, and the ML application 112. For example, the user system 104 may submit requests to perform various functions and view results through frontend interface 164. In various examples, the user client 108 may include another application through which requests are submitted, such as a shell or client application. In some examples, the frontend interface 164 may be an interface used by an agent operating the user system 104 to communicate with another party (e.g., a caller or text correspondent of the user client 108).

In some embodiments, frontend interface 164 is a presentation tier in a multitier application. Frontend interface 164 may process requests received from clients and translate results from other application tiers into a format that may be understood or processed by the clients. Frontend interface 164 may be configured to render user interface elements and receive input via user interface elements. For example, frontend interface 164 may generate webpages and/or other graphical user interface (GUI) objects. Client applications, such as web browsers, may access and render interactive displays in accordance with protocols of the internet protocol (IP) suite. Additionally or alternatively, frontend interface 164 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In one or more embodiments, frontend interface 164 refers to hardware and/or software configured to facilitate communications between a user and the user system 104. The frontend interface 164 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the frontend interface 164 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 164 is specified in one or more other languages, such as Java, C, or C++.

Backend interface 168 may include an API, CLI, or other interfaces for invoking functions to execute actions. One or more of these functions may be provided through cloud services or other applications, which may be external to the user system 104. For example, one or more components of system 104 may invoke an API to access information stored in data repository 116 for use as a training document for the machine learning engine 148. As another example, an API in the backend interface 168 may access communication systems used by agents and callers so as to execute real-time analysis of the audio stream and/or event stream. It will be appreciated considering these examples that the actions that are performed may vary from implementation to implementation.

In some embodiments, the user system 104 may access external resources, such as cloud services. Example cloud services may include, but are not limited to, social media platforms, email services, short messaging services, enterprise management systems, verbal communication systems (e.g., internet based voice communications, text chat communications, PTSN communications systems) and other cloud applications. Backend interface 168 may serve as an API endpoint for invoking a cloud service. For example, backend interface 168 may generate outbound requests that conform to protocols ingestible by external resources. Backend interface 168 may process and translate inbound requests to allow for further processing by other components of the user system 104. The backend interface 168 may store, negotiate, and/or otherwise manage authentication information for accessing external resources. Example authentication information may include, but is not limited to, digital certificates, cryptographic keys, usernames, and passwords. Backend interface 168 may include authentication information in the requests to invoke functions provided through external resources.

Additional embodiments and/or examples relating to computer networks are described below in Section 5, titled "Computer Networks and Cloud Networks."

3. Selecting Portions of a Communication Stream for Real-Time Analysis

Figure 2:
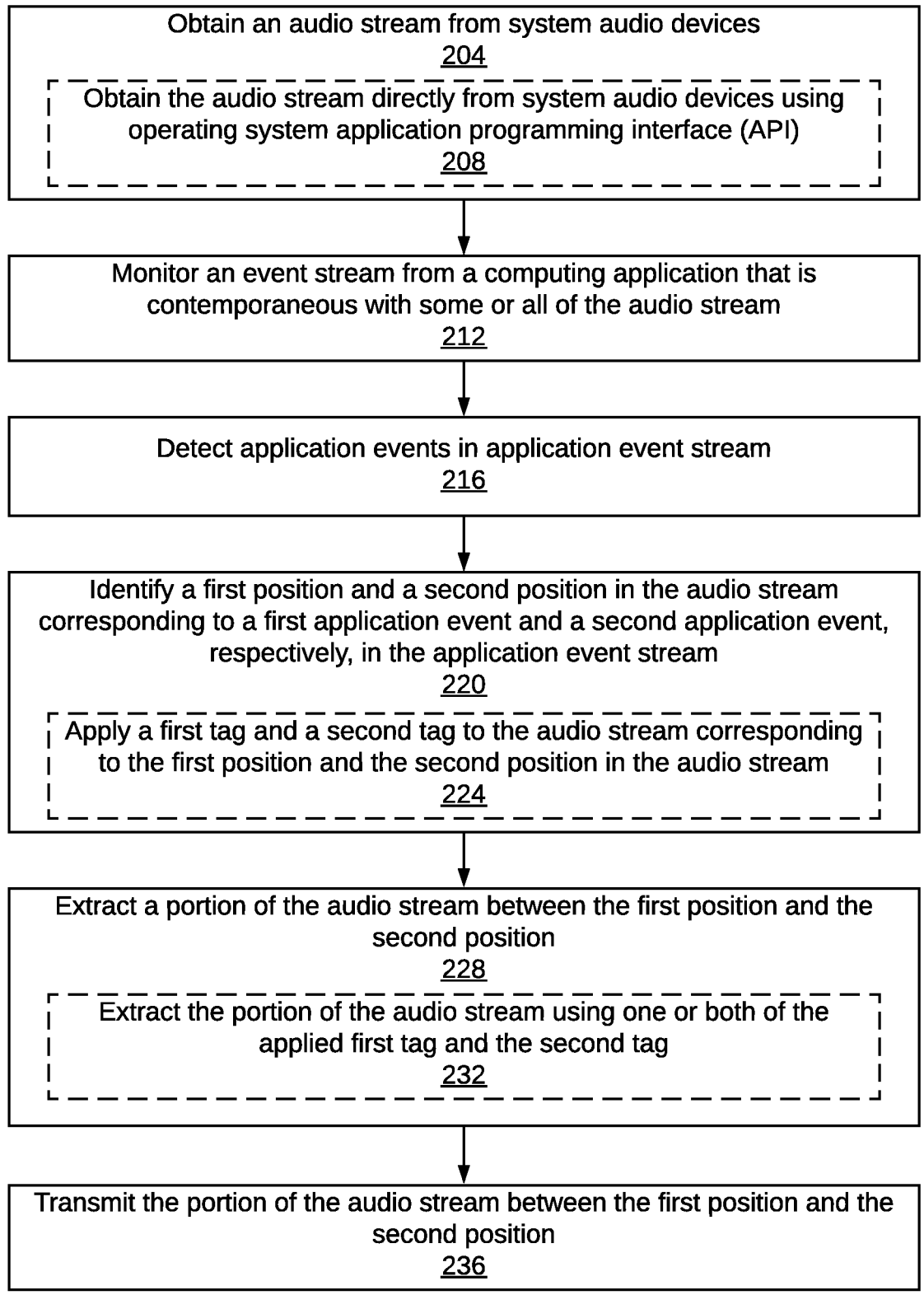
FIG. 2 illustrates an example set of operations for selecting portions of an operating system audio stream for transmission using identified events in an associated application event stream in accordance with one or more embodiments.

FIG. 2 illustrates an example set of operations for selecting portions of an audio stream and transmitting the selected portions for analysis while not transmitting other portions of the audio stream, in accordance with one or more embodiments. As described above, selective transmission of portions of an audio stream improves the speed and computational efficiency of a machine learning analysis of the audio stream, thereby enabling real-time recommendations to be provided in response to the content of the audio stream portions.

Figure 3:
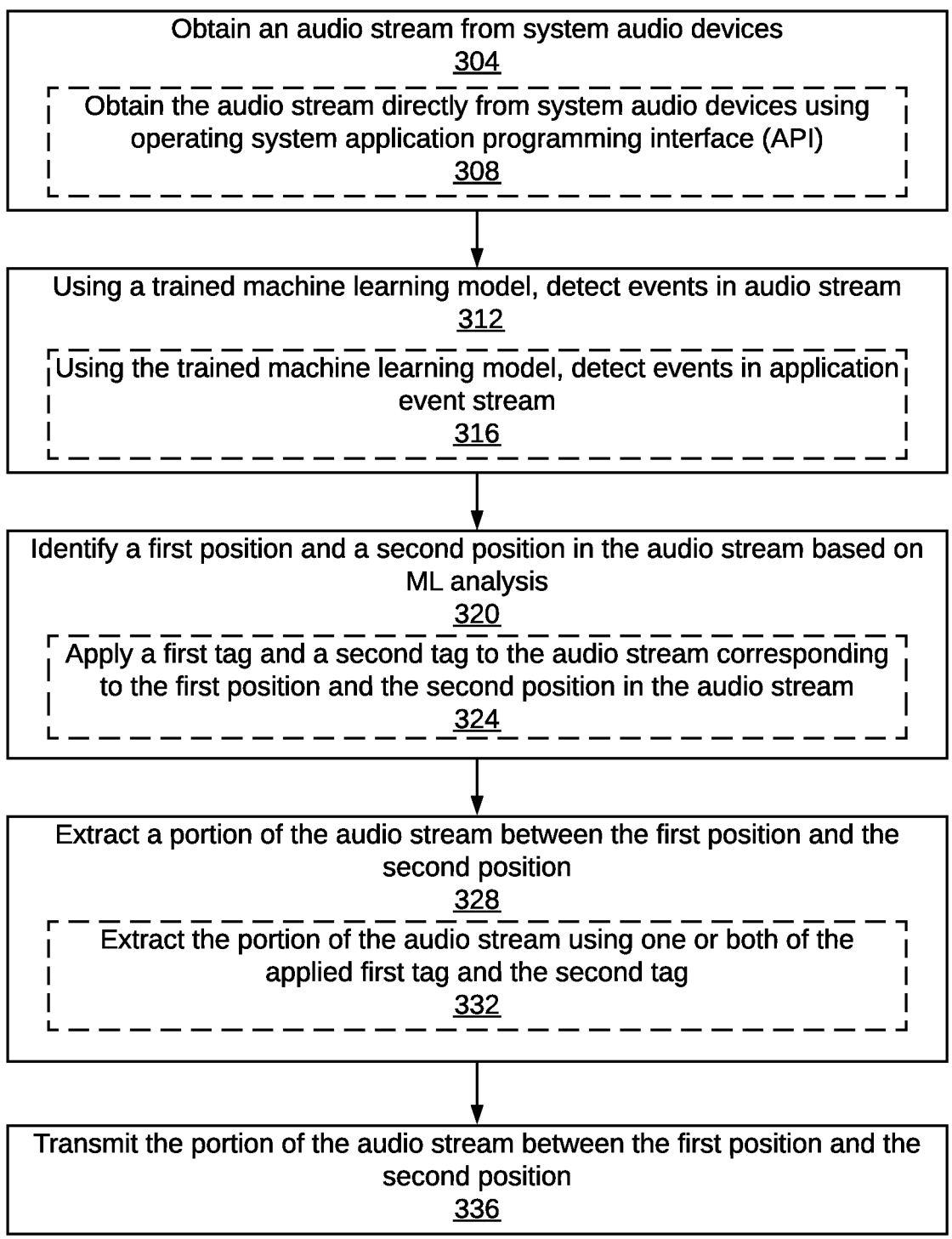
FIG. 3 illustrates an example set of operations for selecting portions of an operating system audio stream for transmission using a trained machine learning model in accordance with one or more embodiments.

The following Sections 3.1 and 3.2, and respective FIGS. 2 and 3, illustrate two different example techniques for selecting portions of an audio stream for analysis. In Section 3.1 and corresponding FIG. 2, one or more portions of an audio stream are selected based on an analysis of a related and contemporaneous event stream associated with a computing application separate from an audio communication application. In Section 3.2 and corresponding FIG. 3, one or more portions of an audio stream are selected responsive to an analysis of the audio stream itself One or more operations illustrated in FIGS. 2 and/or 3 may be modified, rearranged, or omitted all together. Accordingly, the particular sequence of operations illustrated in FIGS. 2 and 3 should not be construed as limiting the scope of one or more embodiments.

3.1 Selecting Portions of an Audio Stream Based on Events in an Event Stream FIG. 2 illustrates an example method 200 for selecting portions of an operating system audio stream for transmission using identified events in an associated application event stream in accordance with one or more embodiments. In some embodiments, the method 200 may begin by obtaining an audio stream directly from audio system devices (operation 204). More specifically, the system may obtain the audio stream from the audio system devices by using an operating system application programming interface (API) to access the audio signals detected by or generated by the system audio devices.

In some examples, a system may include one or more microphones for receiving audio input from a user and may also include one or more speakers for generating audio output from a received signal. Microphones and speakers (collectively referred to herein as "audio devices") associated with computing systems may have any number of configurations and may be connected to the system using wired and/or wireless technologies. Regardless of the physical configuration of the audio devices or the techniques by which the audio devices are communicatively coupled to the system, audio signals transmitted through these devices are often processed by communication interface computing applications. For example, voice over internet protocol (VOIP) applications, session initiation protocol (SIP) applications, among other internet telephony and electronic audio communication systems may access the audio devices. The VOIP and/or SIP applications capture outgoing audio signals in an audio stream by communicating with a microphone, packetizing the captured signals, and transmitting the packets through a packet network. Similarly, VOIP and/or SIP applications receive incoming packets associated with an audio stream, decode the packets, and translate the signals in the decoded packets into a protocol that may be played by a speaker. As used herein, the term "played by a speaker" includes audio output to both integral audio devices (e.g., a speaker built into a user system) as well as separate audio devices that are communicatively coupled to the system via a wired or wireless connection.

However, the transformations of data and the communication between the different computing protocols of audio devices and an audio application causes measurable computing delays and inefficiencies. For example, placing an audio device in communication with an audio application, and translating between the different computing protocols used by the devices and the application may consume resources and time. Similarly, encoding and/or decoding audio signals into and/or from packets consumes additional resources and adds more time. Furthermore, negotiation between the audio application and a communication network in preparation for packet receipt and/or transmission consumes even more resources and takes more time. In some examples, these delays may be inconvenient for supporting real-time machine learning analysis of audio data, as described herein.

To reduce the consumption of computing resources and decrease computation and transmission times, thereby improving the responsiveness of some of the embodiments described herein, the method 200 may include obtaining an audio stream directly from the audio devices using an API of the operating system platform (operation 208). Using an operating system API reduces the number of transitions of audio stream signals, and the required processing, relative to the processing associated with a communications application. For example, the operating system API may directly access the audio devices and in some cases may not even need to translate the signals captured by or produced by the audio devices into a different protocol. In other examples, any translation of audio signals from the audio devices to the operating system API may be performed quickly and efficiently.

In some embodiments, the system may monitor an event stream produced by a computing application that is operating contemporaneously with the audio devices (operation 212). The computing application may generate an event stream that is contemporaneous with the generation of the audio stream (operation 212). In some examples, the system may detect events in the event stream, which may be used to identify portions of the audio stream to transmit to a machine learning application for contemporaneous, real-time analysis of the audio stream.

For example, a call center agent may use one or more computing applications (generating the aforementioned event stream(s)) to assist callers. In one example, a call center agent may use a VOIP or SIP communications application that conveniently uses the internet to receive and transmit voice audio signals. These communications applications may generate an event stream that identifies initiation of a call, termination of a call, increases or decreases in voice volume, changes in bandwidth consumption, and the like. In another example, a call center agent may use a computing application to search and find product information in a database. A database interface and search application may generate an event stream identifying when queries are initiated, when results are returned, query terms (e.g., part numbers and key words), among other types of search functions. In still another example, an agent may use applications for facilitating product orders, product returns, or complaints. Events associated with event streams from one or more of these examples include, but are not limited to, order placement, user account access, requests for pricing change authorization (e.g., a discount), return material authorization (RMA) generation, among others. In still another example, a call center agent may be facilitated by other machine learning tools, such as "chat bots" that automatically generate text communications with a correspondent. Suggestions and/or communications from text-based conversational machine learning tools may also generate detected events. The system may detect events from any one or more of the preceding computing applications, and other computing applications not explicitly mentioned.

Regardless of the computing application used or the events generated by the computing application, the system may detect events in the event stream (operation 216). The system may monitor requested and executed transactions in an operating system queue and compare the transactions to a set of stored rules. The stored rules may associate specific transactions and/or types of transactions with events to be detected and employed according to the method 200. In some examples, the rules may also include a particular source application or destination application associated with specific transactions and/or types of transactions as part of the stored detection criteria.

As indicated above, in some examples the detected events used by the system to identify audio stream portions for analysis may include defined transactions (e.g., queries, query results, task execution such as order placement, RMA generation) executed by the computing application operating as a component of the system. Other types of application events may be detected as well, such as initiating or terminating a communication session, communicating with a call center colleague (e.g., a supervisor via a text chat application) or product supplier (e.g., via an email or text chat computing application or a dedicated supply chain communication interface), among others. Any of the foregoing examples of transactions may also be further defined in the rules with reference to a particular computing application. For example, the combination of (1) execution of a text chat transaction using (2) a supply chain communication interface may be identified as matching with a particular rule in the set of rules, thereby qualifying as a detected event according to the operation 216. In a contrary example, one or both of (1) sending an email (2) using a generic web browser email client may not match a rule and therefore not qualify as a detected event according to the operation 216.

In some examples, the detected events in the event stream (corresponding to the computing application contemporaneously executed with the operating system audio stream) may be used to identify positions in the audio stream that correspond to the detected events (operation 220). Ultimately, and as described below in more detail, the positions in the event stream (as identified by the detected events) may be used to identify portions of the audio stream to either transmit or not transmit for further analysis (e.g., to a machine learning application for real-time recommendations).

In some examples, the event stream and the audio stream are started simultaneously, and no additional synchronization is needed to match events from the event stream with contemporaneously occurring audio stream events. In some examples, the event stream and the audio stream may not be started simultaneously. For this latter type of example, the event stream and audio stream may be synchronized using any number of techniques. For example, the system may refer to application clocks associated with the operating system (which acquires the audio stream) and the computing application (which generates the event stream). The system may then synchronize detected events with contemporaneously occurring audio stream portions based on a comparison of the corresponding clock values (e.g., time stamps). In some examples, the system may combine the synchronized streams into a single combined stream in which both the audio data and the event data are in proper (i.e., synchronous) temporal relationship with one another. Combining audio and event streams into a synchronized, combined stream may improve analytical efficiency in some embodiments.

In some examples, the system may optionally apply tags to the audio stream to denote one or more portions of the audio stream that correspond to the detected events of the event stream (operation 224). For example, upon detecting an event in the event stream and identifying a corresponding portion of the operating system audio stream, the system may apply a tag to the identified corresponding portion of the operating system audio stream. By applying a tag, the system may more efficiently and quickly differentiate between portions of the audio stream to transmit (or not transmit) for further analysis.

In some examples, the system may apply multiple tags to the operating system audio stream (operation 224). For example, the system may apply a first tag to a first position in the operating system audio stream that corresponds to a start of a portion to transmit and a second tag to a second position in the operating system audio stream that corresponds to the end of the portion to transmit. In other examples, a single tag may denote an entire portion of the operating system audio stream to transmit.

The method 200 continues by the system extracting a portion of the operating system audio stream that is associated with the detected events of the event stream (operation 228). In some examples, the extracted portion is between a first position and a second position in the audio stream. In some examples, the first position may be associated with initiation of a call/communication session, submission of a query to a system, and similar events. In some examples, the second position in the audio stream may be associated with termination of a call/communication session, completion of a transaction in an application, and similar events. For embodiments in which tags are employed (in operation 224), the system may extract the portion of the audio stream using the one or more tags. For examples, the system may extract a portion of the audio stream between a first tag associated a first position and a second tag associated with a second position.

In some examples, extraction a portion of the audio stream may be based on a single event. For example, the portion extracted may be triggered by initiation or termination of a call with the portion extracted extending a defined period of time before or after the triggering event. In one embodiment, the extracted portion may extend 15 seconds, 30 seconds, 60 seconds, or a similar time period before the termination of a call or after initiation of a call. In another example, the system may detect a call expressing frustration or declining an offer, and capture a time period of 5 seconds, 30 seconds, 60 seconds, or a similar time period before the expression of frustration or the rejecting the offer. Similar single events that trigger the extraction of a portion of the audio stream will be appreciated.

Once extracted, the system may transmit the extracted portion of the audio stream (operation 236). In one example, the system transmits the extracted portion of the audio stream to a trained machine learning model. The trained machine learning model may analyze the content of the conversation stored in the extracted portion of the audio stream and provide an agent with one or more recommendations based on the analysis. These recommendations may provide guidance on conversational responses that are likely to produce a favorable outcome of the conversation. As mentioned above, because embodiments of the method 200 are focused on selected portions of an audio stream, the training machine learning model may provide recommendations to an agent for the conversation in real-time and consistent with a normal pace of verbal communication. The operation of the trained machine learning models is described in U.S. patent application Ser. Nos. 16/836,831 and 16/944,651, the details of which are incorporated herein in their entireties.

3.2 Selecting Portions of an Audio Stream Based on Machine Learning Analysis of the Audio Stream FIG. 3 illustrates an example method 300 for selecting portions of an operating system audio stream for transmission. The operations of the method 300 employ a trained machine learning model to identify portions of the audio stream to transmit (or not transmit), unlike the method 200 which relies on detected events in a contemporaneously occurring event stream combined with stored rules, in accordance with one or more embodiments The method 300 may begin with operations similar to those described above in the context of FIG. 2 and the method 200. That is, the system may obtain an audio stream from system audio devices (operation 304) directly using an operating system API (operation 308).

The system monitors the obtained audio stream and, using a trained machine learning model, may detect events in the audio stream that, as described below, may be used to identify one or more portions to transmit for additional analysis (operation 312). Alternatively or additionally, the system may identify one or more portions to refrain from transmitting. The machine learning model may be trained according to the techniques described above in the context of FIG. 1.

In addition to the detailed explanation above in FIG. 1, the training of the machine learning model may be performed by obtaining historical audio streams that have been tagged or labeled to indicate transmitted portions and/or portions not transmitted. In some examples, a first set of tags may be used to indicate starting points and ending points of one or more portions of an audio stream that were transmitted. Similarly, in some examples, a second set of tags may be used to indicate starting points and ending points of one or more portions of an audio stream that were not transmitted. The first set of tags and the second set of tags may be used in combination in a same audio stream. These labeled (i.e., tagged) historical audio streams may be used to generate a training set that is used to train a machine learning model to identify portions of "target" (i.e., not historical) audio streams to transmit to a separate machine learning model that may analyze the content of the portion. Examples of machine learning model algorithms trained by the training set are described above in the context of FIG. 1.

More specifically, the trained machine learning model may analyze the content of the audio stream itself to identify portions of the audio stream to transmit and/or not transmit. For example, the machine learning model may be trained to recognize a preliminary portion of a conversation by identifying an exchange of salutations ("Good Morning," "Hello") and/or an invitation to enter into more detailed discussions ("How may I help you?"). The machine learning model may be further trained to refrain from transmitting this preliminary portion. This portion of a conversation is generally simple to navigate, being mostly formulaic, and therefore may be omitted from a transmission to reduce unnecessary analysis.

The machine learning model may be further trained to associate more substantive conversational content with events that trigger transmission of a portion of the operating system audio stream. For example, the machine learning model may identify phrases such as "I need your help," "I have a problem," "I am interested in . . . ," and the like. These phrases indicate the purpose of a conversation, which may benefit from transmission and real-time analysis.

Similarly, the system may be trained to recognize personal information, confidential information, or other information provided by a caller that should be omitted from analysis and therefore not transmitted. Phrases such as "credit card number," "social security," "birth date" and the like may be recognized by the system and omitted from transmission. Other types of information, such as profane or emotionally charged language may also be tagged or labeled so that an associated portion of the operating system audio stream that contains this type of information is not transmitted.

Similar to the method 200, the machine learning model may also be trained to detect audio stream events based on events detected in an event stream that was contemporaneously executed with the audio stream (operation 316). This is analogous to the process described above, with the exception that the training set used to train the machine learning model includes historical computing application event streams in addition to historical audio streams. In one example, the historical event streams may be labeled (or tagged) to indicate application events that correspond to audio stream portions to transmit and/or not transmit.

Using the trained machine learning model in this way enables the system to identify different positions in the audio stream (operation 320). In one example, at least a first position and a second position may be identified. In this example, the first position may correspond to a starting position of a portion to transmit and the second position may correspond to an ending position of the portion to transmit. Other characterizations of the positions are also possible in other embodiments. In a different example, one position may be associated with an entire portion to transmit and another position may be associated with a different portion to not transmit. As described above, a position may optionally be denoted or otherwise identified in the audio stream using a tag. For example, a first tag may correspond to the first position and a second tag may correspond to the second position (operation 324).

Once identified, the system may extract a portion of the audio stream between the designated positions (operation 328). In some examples, the extracted portion may be identified and extracted according to one or more of the applied tags (operation 332). The extracted portion may then be transmitted to a separate machine learning model and analyzed according to the techniques described in U.S. patent application Ser. Nos. 16/836,831 and 16/944,651, the details of which are incorporated herein in their entireties.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
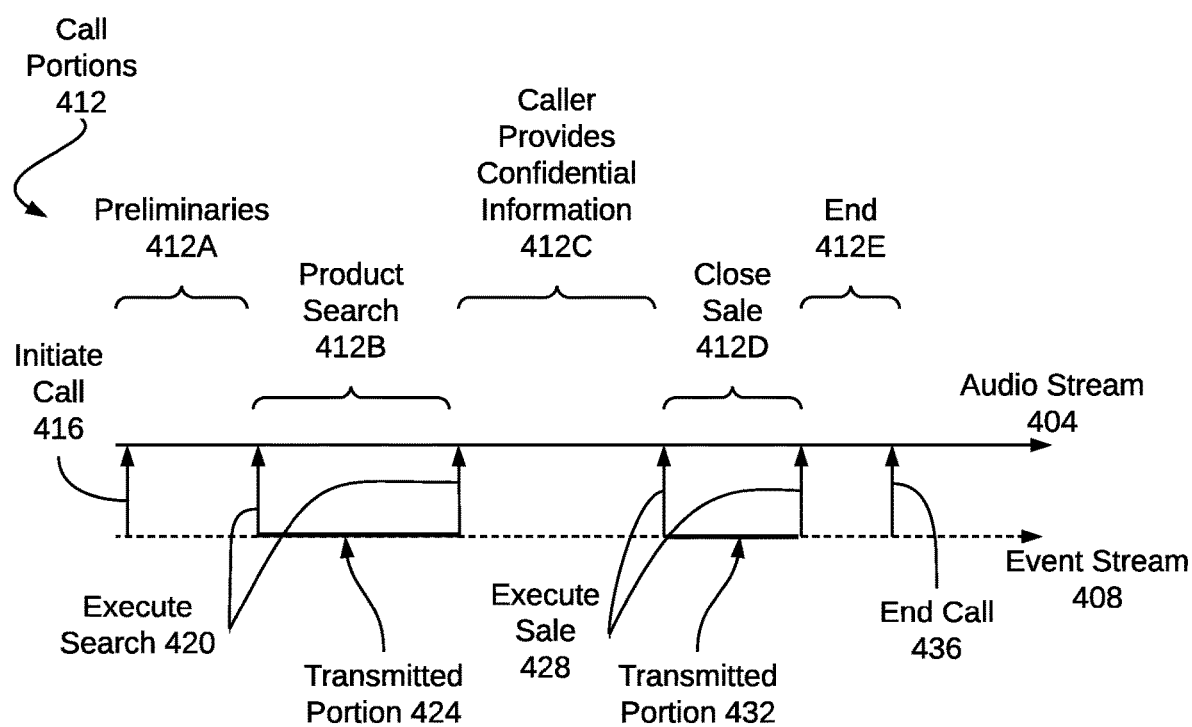
FIG. 4 is a schematic illustration of an example scenario in which detected events in an application event stream are used to select portions of an operating system audio stream for transmission in accordance with one or more embodiments.

FIG. 4 schematically illustrates using detected events in an associated computing application event stream for selecting portions of an operating system audio stream for transmission in accordance with one or more embodiments. It will be appreciated that an event stream is not necessary in some embodiments, as described above.

The scenario 400 includes an audio stream 404 and a synchronized event stream 408 that is executed contemporaneously with the audio stream 404 by a computing application. Call portions 412A, 412B, 412C, 412D, and 412E (collectively call portions 412) are labeled in FIG. 4 for convenience of description.

As shown, the event stream 408 includes a detected call initiation event 416. The call portion 412 immediately following the initiation 416 is identified as a preliminary portion 412A. As described above, this portion of a conversation is simple to navigate (usually involving the exchange of salutations and pleasantries) and is tagged as a portion to not transmit. Identification of the portion 412A as a preliminary portion to refrain from transmitting may be accomplished by a machine learning analysis or rule-based analysis.

The system detects the execution and completion of a search 420 in the accompanying event stream 408. The audio stream portion 412B, which is associated with product search portion 412B, is tagged as a portion 424 to transmit.

The next call portion 412C corresponds to a caller providing confidential information. A machine learning engine analyzing audio stream data in real time may identify this confidential information (e.g., a social security number, financial account numbers, personal information) and not transmit the portion 412C.

The system then detects transactions in the event stream corresponding to execution of a sale 428. Because a conversation negotiating a sale may be delicate, and benefit from real-time analysis, the system tags portion 412D to be transmitted as portion 432. The call and communication session may be terminated upon detecting an ending transaction 436.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
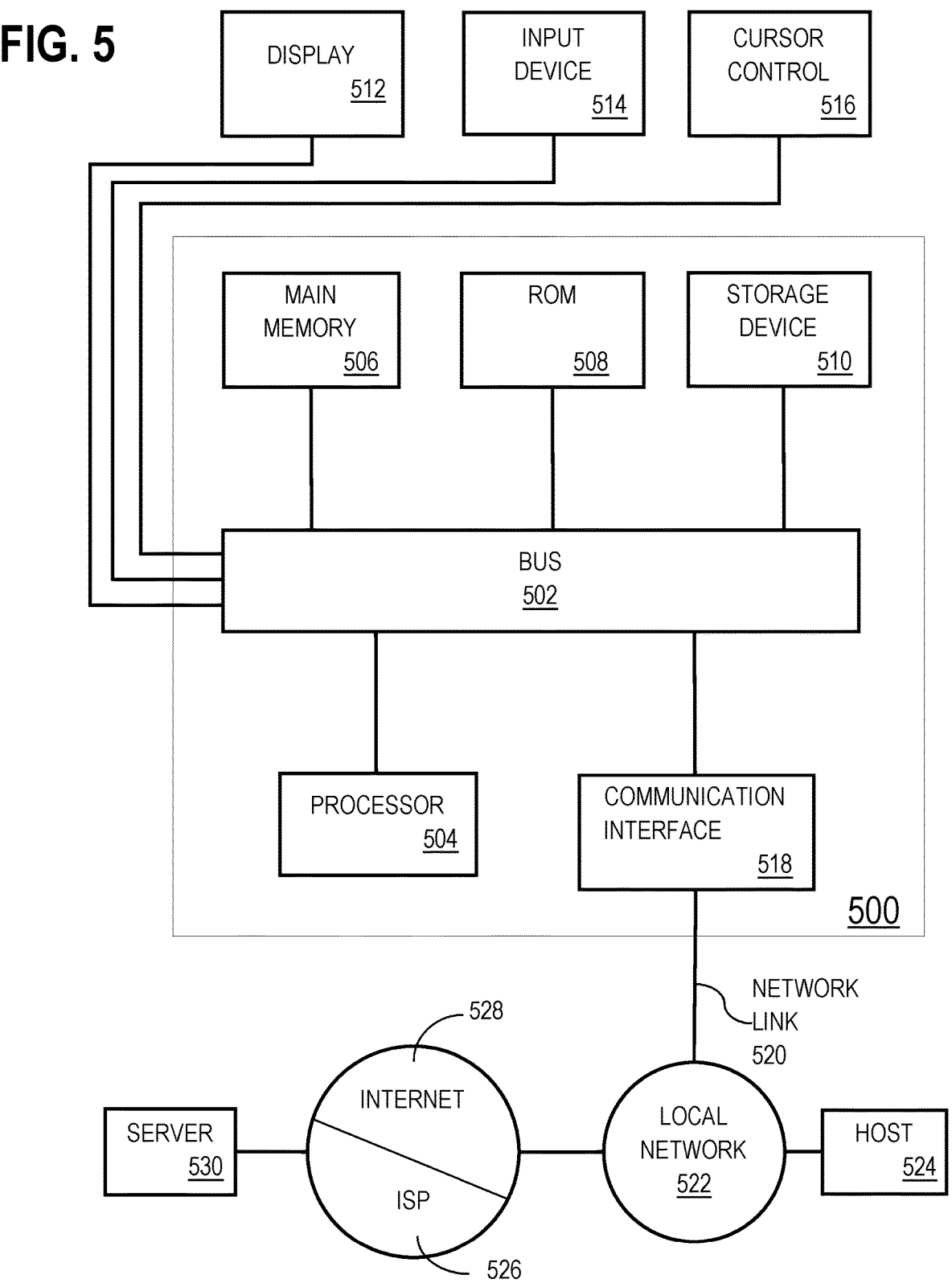
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:

obtaining, from an operating system platform executing on a device, an operating system audio stream comprising one or more of a first set of audio signals detected by a microphone associated with the device or a second set of audio signals played by a speaker associated with the device, wherein a first time marker is associated with a first point in the operating system audio stream;

detecting an event stream corresponding to an application contemporaneous with at least a portion of the operating system audio stream, wherein a second time marker is associated with a second point in the event stream;

determining that the first point in the operating system audio stream is coincident with the second point in the event stream;

synchronizing the operating system audio stream and the event stream such that the first time marker of the operating system audio stream and the second time marker of the event stream are aligned;

using the synchronized operating system audio and event streams, extracting a particular portion of the operating system audio stream based on at least one event in the event stream; and transmitting the particular portion of the operating system audio stream without transmitting one or more other portions of the operating system audio stream.

2. The media of claim 1, wherein the synchronizing operating comprises comparing an operating system clock time marker associated with the operating system audio stream with an event application clock time marker associated with the event stream, the comparing identifying a common time point between the operating system audio stream and the event stream.

3. The media of claim 1, further comprising combining the synchronized operating system audio and event streams into a combined media stream, and wherein the transmitting operation includes transmitting an identified portion of the combined media stream without transmitting one or more other portions of the combined media stream.

4. The media of claim 1, wherein determining that the first point in the operating system audio stream is aligned with the second point in the event stream comprises detecting a phrase in the operating system audio stream that is associated with an initiation event of a computing application that is detected in the event stream.

5. The media of claim 4, wherein the detected phrase corresponds to a phrase associated with a sale commercial transaction and the detected initiation event of the computing application is associated with a sales management computing application.

6. The media of claim 4, wherein the detected phrase corresponds to a phrase associated with a product return commercial transaction and the detected initiation event of the computing application is associated with a return management computing application.

7. The media of claim 4, wherein the detected initiation event of the computing application comprises a change in bandwidth consumption.

8. A method comprising:
obtaining, from an operating system platform executing on a device, an operating system audio stream comprising one or more of a first set of audio signals detected by a microphone associated with the device or a second set of audio signals played by a speaker associated with the device, wherein a first time marker is associated with a first point in the operating system audio stream;
detecting an event stream corresponding to an application contemporaneous with at least a portion of the operating system audio stream, wherein a second time marker is associated with a second point in the event stream;
determining that the first point in the operating system audio stream is coincident with the second point in the event stream;
synchronizing the operating system audio stream and the event stream such that the first time marker of the operating system audio stream and the second time marker of the event stream are aligned;
using the synchronized operating system audio and event streams, extracting a particular portion of the operating system audio stream based on at least one event in the event stream; and
transmitting the particular portion of the operating system audio stream without transmitting one or more other portions of the operating system audio stream.

9. The method of claim 8, wherein the synchronizing operating comprises comparing an operating system clock time marker associated with the operating system audio stream with an event application clock time marker associated with the event stream, the comparing identifying a common time point between the operating system audio stream and the event stream.

10. The method of claim 8, further comprising combining the synchronized operating system audio and event streams into a combined media stream, and wherein the transmitting operation includes transmitting an identified portion of the combined media stream without transmitting one or more other portions of the combined media stream.

11. The method of claim 8, wherein determining that the first point in the operating system audio stream is aligned with the second point in the event stream comprises detecting a phrase in the operating system audio stream that is associated with an initiation event of a computing application that is detected in the event stream.

12. The method of claim 11, wherein the detected phrase corresponds to a phrase associated with a sale commercial transaction and the detected initiation event of the computing application is associated with a sales management computing application.

13. The method of claim 11, wherein the detected phrase corresponds to a phrase associated with a product return commercial transaction and the detected initiation event of the computing application is associated with a return management computing application.

14. The method of claim 11, wherein the detected initiation event of the computing application comprises a change in bandwidth consumption.

15. A system comprising:
at least one device including a hardware processor;
the system being configured to perform operations comprising:
obtaining, from an operating system platform executing on a device, an operating system audio stream comprising one or more of a first set of audio signals detected by a microphone associated with the device or a second set of audio signals played by a speaker associated with the device, wherein a first time marker is associated with a first point in the operating system audio stream;
detecting an event stream corresponding to an application contemporaneous with at least a portion of the operating system audio stream, wherein a second time marker is associated with a second point in the event stream;
determining that the first point in the operating system audio stream is coincident with the second point in the event stream;
synchronizing the operating system audio stream and the event stream such that the first time marker of the operating system audio stream and the second time marker of the event stream are aligned;
using the synchronized operating system audio and event streams, extracting a particular portion of the operating system audio stream based on at least one event in the event stream; and
transmitting the particular portion of the operating system audio stream without transmitting one or more other portions of the operating system audio stream.

16. The system of claim 15, wherein the synchronizing operating comprises comparing an operating system clock time marker associated with the operating system audio stream with an event application clock time marker associated with the event stream, the comparing identifying a common time point between the operating system audio stream and the event stream.

17. The system of claim 15, further comprising combining the synchronized operating system audio and event streams into a combined media stream, and wherein the transmitting operation includes transmitting an identified portion of the combined media stream without transmitting one or more other portions of the combined media stream.

18. The system of claim 15, wherein determining that the first point in the operating system audio stream is aligned with the second point in the event stream comprises detecting a phrase in the operating system audio stream that is associated with an initiation event of a computing application that is detected in the event stream.

19. The system of claim 18, wherein the detected phrase corresponds to a phrase associated with a sale commercial transaction and the detected initiation event of the computing application is associated with a sales management computing application.

20. The system of claim 18, wherein the detected phrase corresponds to a phrase associated with a product return commercial transaction and the detected initiation event of the computing application is associated with a return management computing application.

\* \* \* \* \*